(12) United States Patent
Stapleton et al.

(10) Patent No.: US 10,750,382 B2
(45) Date of Patent: *Aug. 18, 2020

(54) OPTIMIZATION OF TRAFFIC LOAD IN A DISTRIBUTED ANTENNA SYSTEM

(71) Applicant: DALI WIRELESS, INC., Menlo Park, CA (US)

(72) Inventors: Shawn Patrick Stapleton, Burnaby (CA); Seyed Amin Hejazi, Burnaby (CA)

(73) Assignee: DALI WIRELESS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/661,368

(22) Filed: Oct. 23, 2019

(65) Prior Publication Data

US 2020/0154288 A1 May 14, 2020

Related U.S. Application Data

(63) Continuation of application No. 13/950,160, filed on Jul. 24, 2013, now Pat. No. 10,506,454.

(60) Provisional application No. 61/678,016, filed on Jul. 31, 2012.

(51) Int. Cl.
*H04W 24/02* (2009.01)
*H04W 16/04* (2009.01)
*H04W 88/08* (2009.01)

(52) U.S. Cl.
CPC ........... *H04W 24/02* (2013.01); *H04W 16/04* (2013.01); *H04W 88/085* (2013.01)

(58) Field of Classification Search
CPC ............. H04W 88/085; H04B 10/2575; H04B 10/25753; H04L 41/5025
See application file for complete search history.

(56) References Cited

U.S. PATENT DOCUMENTS

| | | | | |
|---|---|---|---|---|
| 6,785,558 | B1* | 8/2004 | Stratford | H04W 88/085 455/561 |
| 8,498,207 | B2* | 7/2013 | Trigui | H04L 41/5025 370/235 |
| 10,264,626 | B2* | 4/2019 | Lee | H04W 4/70 |
| 10,506,454 | B2* | 12/2019 | Stapleton | H04W 16/04 |
| 2002/0119772 | A1* | 8/2002 | Yoshida | H04W 24/00 455/423 |
| 2008/0139205 | A1* | 6/2008 | Sayeedi | H04W 36/0038 455/436 |
| 2010/0278530 | A1* | 11/2010 | Kummetz | H04B 10/2575 398/41 |
| 2012/0039320 | A1* | 2/2012 | Lemson | H03F 1/3247 370/338 |

(Continued)

*Primary Examiner* — Matthew C Sams
(74) *Attorney, Agent, or Firm* — Jason H. Vick; Sheridan Ross, PC

(57) ABSTRACT

A system for dynamically routing signals in a Distributed Antenna System includes a plurality of Digital Access Units (DAUs). The plurality of DAUs are coupled and operable to route signals between the plurality of DAUs. The system also includes a plurality of Digital Remote Units (DRUs) coupled to the plurality of DAUs and operable to transport signals between DRUs and DAUs and a plurality of Base Transceiver Stations (BTS). The system further includes a plurality of traffic monitoring modules and a network optimization goal and optimization algorithm.

19 Claims, 11 Drawing Sheets

(56) References Cited

U.S. PATENT DOCUMENTS

| | | | |
|---|---|---|---|
| 2013/0071112 A1* | 3/2013 | Melester | H04B 17/0085 |
| | | | 398/38 |
| 2013/0114963 A1* | 5/2013 | Stapleton | H04W 24/02 |
| | | | 398/115 |
| 2013/0128810 A1* | 5/2013 | Lee | H04W 84/042 |
| | | | 370/328 |

* cited by examiner

OPTIMIZATION OF TRAFFIC LOAD IN A DISTRIBUTED ANTENNA SYSTEM

CROSS-REFERENCES TO RELATED APPLICATIONS

This application is a continuation of pending U.S. patent application Ser. No. 13/950,160 filed Jul. 24, 2013, now U.S. Pat. No. 10,506,454, entitled "OPTIMIZATION OF TRAFFIC LOAD IN A DISTRIBUTED ANTENNA SYSTEM", which application claims priority to U.S. Provisional Patent Application No. 61/678,016, filed on Jul. 31, 2012, entitled "OPTIMIZATION OF TRAFFIC LOAD IN A DISTRIBUTED ANTENNA SYSTEM". The aforementioned applications are incorporated herein by reference, in their entirety, for any purpose.

SUMMARY OF THE INVENTION

The present invention generally relates to wireless communication systems employing Distributed Antenna Systems (DAS) as part of a distributed wireless network. More specifically, the present invention relates to a DAS utilizing traffic monitoring and optimization. Wireless network operators faces the continuing challenge of building networks that effectively manage high data-traffic growth rates. Mobility and an increased level of multimedia content for end users typically employs end-to-end network adaptations that support new services and the increased demand for broadband and flat-rate Internet access. One of the most difficult challenges faced by network operators is caused by the physical movement of subscribers from one location to another, and particularly when wireless subscribers congregate in large numbers at one location. A notable example is a business enterprise facility during lunchtime, when a large number of wireless subscribers visit a lunch room or cafeteria location in the building. At that time, a large number of subscribers have moved away from their offices and usual work areas. It's likely that during lunchtime, there are many locations throughout the facility where there are very few subscribers. If the indoor wireless network resources were properly sized during the design process for subscriber loading as it is during normal working hours when subscribers are in their normal work areas, it is very likely that the lunchtime scenario will present some unexpected challenges with regard to available wireless capacity and data throughput.

According to an embodiment of the present invention, a system for dynamically routing signals in a Distributed Antenna System is provided. The system includes a plurality of Digital Access Units (DAUs). The plurality of DAUs are coupled and operable to route signals between the plurality of DAUs. The system also includes a plurality of Digital Remote Units (DRUs) coupled to the plurality of DAUs and operable to transport signals between DRUs and DAUs. The system further includes one or more Base Transceiver Stations (BTSs) and one or more traffic monitoring units.

According to another embodiment of the present invention, a system for dynamically routing signals in a Distributed Antenna System is provided. The system includes a plurality of Digital Access Units (DAUs). The plurality of DAUs are coupled and operable to route signals between the plurality of DAUs. The system also includes a plurality of Digital Remote Units (DRUs) coupled to the plurality of DAUs and operable to transport signals between DRUs and DAUs and a plurality of Base Transceiver Stations (BTS). The system further includes a plurality of traffic monitoring modules and a network optimization goal and optimization algorithm.

In an embodiment, a system for dynamically routing signals in a Distributed Antenna System is provided and includes a plurality of Digital Access Units (DAUs). The plurality of DAUs are coupled and operable to route signals between the plurality of DAUs. The system also includes a plurality of Digital Remote Units (DRUs) coupled to the plurality of DAUs and operable to transport signals between DRUs and DAUs and one or more Base Transceiver Stations (BTSs). The system further includes a traffic monitoring unit.

Numerous benefits are achieved by way of the present invention over conventional techniques. For example, embodiments of the present invention provide for traffic monitoring in a DAS network, improving network performance and user experience. These and other embodiments of the invention along with many of its advantages and features are described in more detail in conjunction with the text below and attached figures.

DETAILED DESCRIPTION OF THE INVENTION

Figure 1:
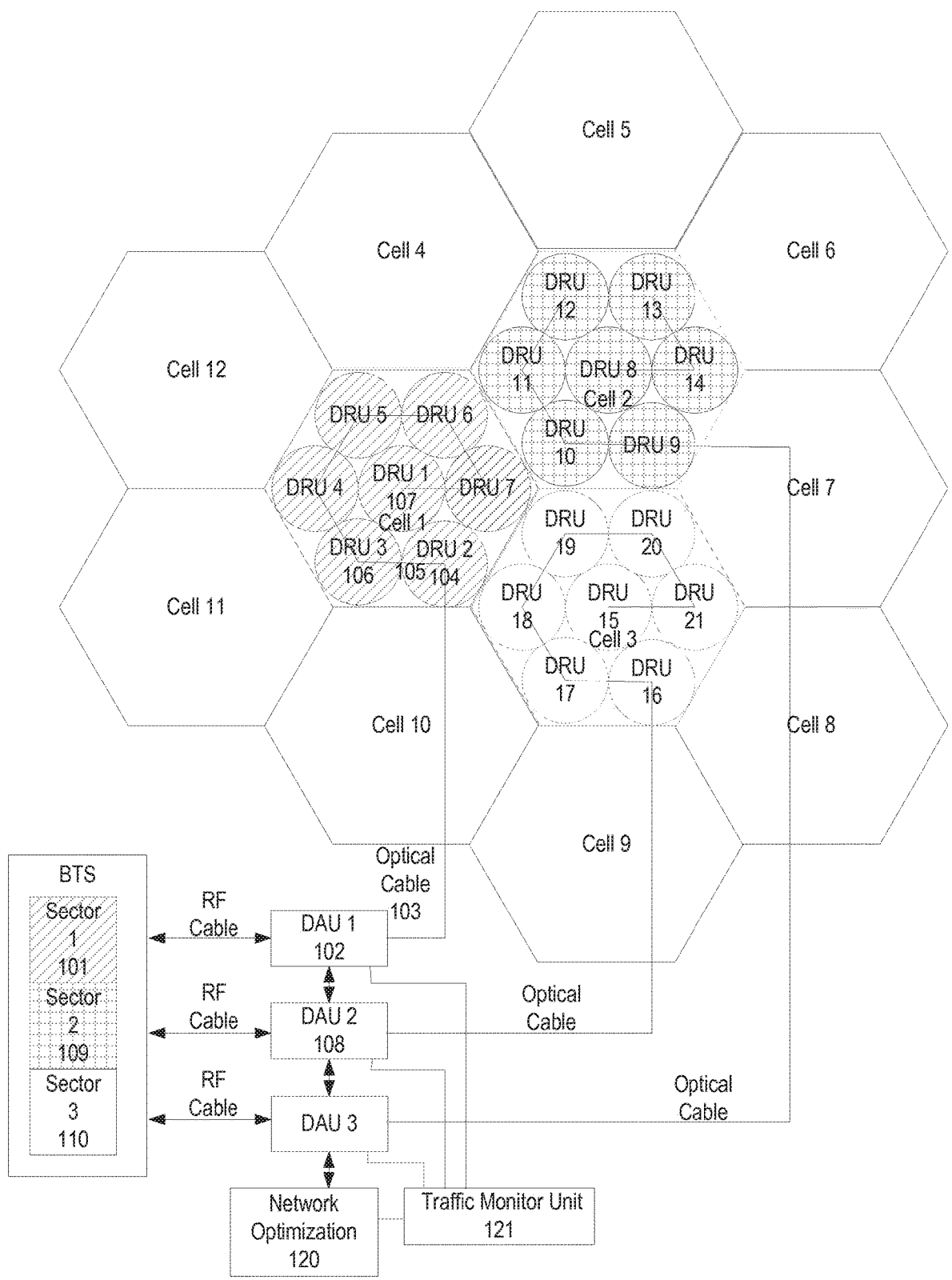
FIG. 1 is a block diagram according to one embodiment of the invention showing the basic structure and an example of the transport routing, traffic monitoring and network optimization based on having a single 3 sector BTS with 3 DAUs and 7 DRUs daisy chained together for each cell.

To accommodate variations in wireless subscriber loading at wireless network antenna locations at various times of day and for different days of the week, there are several candidate conventional approaches.

One approach is to deploy many low-power high-capacity base stations throughout the facility. The quantity of base stations is determined based on the coverage of each base station and the total space to be covered. Each of these base stations is provisioned with enough radio resources, i.e., capacity and broadband data throughput to accommodate the maximum subscriber loading which occurs during the course of the workday and work week. Although this approach typically yields a high quality of service for wireless subscribers, the notable disadvantage of this approach is that many of the base stations' capacity is being wasted for a large part of the time. Since a typical indoor wireless network deployment involves capital and operational costs which are assessed on a per-subscriber basis for each base station, the typically high total life cycle cost for a given enterprise facility is far from optimal.

A second candidate approach involves deployment of a DAS along with a centralized group of base stations dedicated to the DAS. A conventional DAS deployment falls into one of two categories. The first type of DAS is "fixed", where the system configuration doesn't change based on time of day or other information about usage. The remote units associated with the DAS are set up during the design process so that a particular block of base station radio resources is thought to be enough to serve each small group of DAS remote units. A notable disadvantage of this approach is that most enterprises seem to undergo frequent re-arrangements and re-organizations of various staff groups within the enterprise. Therefore, it's highly likely that the initial DAS setup will need to be changed from time to time, requiring deployment of additional direct staff and contract resources with appropriate levels of expertise regarding wireless networks.

The second type of DAS is equipped with a type of network switch which allows the location and quantity of DAS remote units associated with any particular centralized base station to be changed manually. Although this approach would appear to support dynamic DAS reconfiguration based on the needs of the enterprise or based on time of day, it frequently implies that additional staff resources would need to be assigned to provide real-time management of the network. Another issue is that it's not always correct or best to make the same DAS remote unit configuration changes back and forth on each day of the week at the same times of day. Frequently it is difficult or impractical for an enterprise IT manager to monitor the subscriber loading on each base station. And it is almost certain that the enterprise IT manager has no practical way to determine the loading at a given time of day for each DAS remote unit; they can only guess the percentage loading.

Another major limitation of conventional DAS deployments is related to their installation, commissioning and optimization process. Some challenging issues which must be overcome include selecting remote unit antenna locations to ensure proper coverage while minimizing downlink interference from outdoor macro cell sites, minimizing uplink interference to outdoor macro cell sites, and ensuring proper intra-system handovers while indoors and while moving from outdoors to indoors (and vice-versa). The process of performing such deployment optimization is frequently characterized as trial-and-error. Therefore, the results may not be consistent with a high quality of service.

Based on the conventional approaches described herein, it is apparent that a highly efficient, easily deployed and dynamically reconfigurable wireless network is not achievable with conventional systems and capabilities. Embodiments of the present invention substantially overcome the limitations of the conventional approach discussed above. The advanced system architecture provided by embodiments of the present invention provides a high degree of flexibility to manage, control, enhance and facilitate radio resource efficiency, usage and overall performance of the distributed wireless network. This advanced system architecture enables specialized applications and enhancements including, but not limited to, flexible simulcast, automatic traffic load-balancing, network and radio resource optimization, network calibration, autonomous/assisted commissioning, carrier pooling, automatic frequency selection, radio frequency carrier placement, traffic monitoring, and/or traffic tagging. Embodiments of the present invention can also serve multiple operators, multi-mode radios (modulation-independent) and multiple frequency bands per operator to increase the efficiency and traffic capacity of the operators' wireless networks.

Accordingly, embodiments of this architecture provide a capability for Flexible Simulcast. With Flexible Simulcast, the amount of radio resources (such as RF carriers, LTE Resource Blocks, CDMA codes or TDMA time slots) assigned to a particular DRU or group of DRUs can be set via software control to meet desired capacity and throughput objectives or wireless subscriber needs. Applications of the present invention are suitable to be employed with distributed base stations, distributed antenna systems, distributed repeaters, mobile equipment and wireless terminals, portable wireless devices, and other wireless communication systems such as microwave and satellite communications.

According to an embodiment of the present invention, a traffic monitoring unit is provided as a component of one or more elements of the system, enabling measurement of the network traffic in the network. A network optimization goal and optimization algorithm is also provided so that based on traffic measurements, which is typically a function of the number of users on the system, performance of the network is optimized using the goal and associated algorithm.

As an example of traffic monitoring, the system could track the power of the down link or the power of the uplink. Another example, would include some signal processing, including examining certain control signals, for example, pilot signals sent by mobile devices. By locking onto these control signals, the traffic monitor can obtain information on the number of users using various components of the system.

A distributed antenna system (DAS) provides an efficient means of utilization of base station resources. The base station or base stations associated with a DAS can be located in a central location and/or facility commonly known as a base station hotel. The DAS network comprises one or more digital access units (DAUs) that function as the interface between the base stations and the digital remote units (DRUs). The DAUs can be collocated with the base stations. The DRUs can be daisy chained together and/or placed in a star configuration and provide coverage for a given geographical area. The DRUs are typically connected with the DAUs by employing a high-speed optical fiber link. This approach facilitates transport of the RF signals from the base stations to a remote location or area served by the DRUs. A typical base station comprises 3 independent radio resources, commonly known as sectors. These 3 sectors are typically used to cover 3 separate geographical areas without creating co-channel interference between users in the 3 distinct sectors.

Traffic monitoring in a DAS network is provided by embodiments of the present invention, which has not been performed in conventional systems. As described herein, the traffic monitoring unit can be implemented as a stand-alone unit in conjunction with one or more system components, including DAUs, DRUs, a BTS, a BTS hotel, or the like.

Once traffic resources are aggregated into eNodeB hotels, the discrete resources of a single eNodeB are still allocated to a specific set of antennas associated with that eNodeB and providing coverage to a specific geographic area. The traffic resources are fixed, i.e., only the resources associated with a specific eNodeB can be allocated to the antennas associated with that eNodeB. However, because the eNodeBs are collocated in an eNodeB hotel, the system can use the aggregated traffic resources of the discrete eNodeBs as a single, pooled traffic resource that can be allocated according to various algorithms. Assumptions are typically predicated on worst-case traffic assets in all areas, network design is wasteful 99 percent of the time, inevitably resulting in over- or under-provisioning of fixed resources. Traffic resources either go unused (idle channels), or are under-provisioned and are insufficient to handle the offered traffic. Both circumstances give rise to the same outcome: lost revenue and lost opportunity. When a site's traffic resources are idle and unused, the traffic asset fails to provide an optimal return on investment. But a site that lacks sufficient capacity to support the offered traffic at any point during the day garners dropped calls, lost revenue opportunity, and dissatisfied customers. The traffic information derived from an extensive sensor network will be used to dynamically allocate the traffic resources to the required geographical areas only for the time period the service is needed. Once the service is supplied and the traffic sensor network determines that the traffic resources are no longer required, they are returned to the resource pool for reallocation. The entire network automatically reconfigures itself based on the perceived (sensed) need or in the event of disruption due to natural or manmade events. Geographic load balancing using DAS is recognized as a new approach for traffic load balancing which provides dynamic load redistribution in real time according to the current geographic traffic conditions. It can be used to improve the performance for any distributed systems containing non-uniformly distributed traffic, especially for resolving traffic hot spots.

The network's performance (expressed by the number of KPIs (Key Performance Indicators) from different parts of the network) determines the QoS values. Different operators may have different defined business goals and different services of interest. Based on these considerations, efficient and cost effective network performance management varies from operator to operator. Therefore, QoS metrics could be defined and mapped to a set of KPIs.

An embodiment shown in FIG. 1 illustrates a basic DAS network architecture according to an embodiment of the present invention and provides an example of a data transport network, traffic monitoring and network optimization scenario between a 3 sector Base Station and multiple DRUs. In this embodiment, the DRUs are daisy chained together to achieve coverage in a specific geographical area. Each individual sector covers an independent geographical area, which is identified as a Cell. Although embodiments are discussed in terms of optimization of DAS networks, the term optimization is properly understood to include performance improvements in comparison to conventional systems, even if complete optimization is not achieved. Thus, optimization does not require the maximum values for traffic management metrics, but also includes distribution of traffic that improves system performance while remaining short of maximum performance.

FIG. 1 depicts a DAS system employing multiple Digital Remote Units (DRUs) and multiple Digital Access Units (DAUs). In accordance with the present invention, each DRU provides unique information associated with each DRU which uniquely identifies uplink data received by that particular Digital Remote Unit.

One feature of embodiments of the present invention is the ability to route Base Station radio resources among the DRUs or group(s) of DRUs. In order to route radio resources available from one or more Base Stations, it is desirable to configure the individual router tables of the DAUs and DRUs in the DAS network. This functionality is provided by embodiments of the present invention.

The DAUs are networked together to facilitate the routing of DRU signals among multiple DAUs. The DAUs support the transport of the RF downlink and RF uplink signals between the Base Station and the DRUs. This architecture enables the various Base Station signals to be transported to and from multiple DRUs. PEER ports are used for interconnecting DAUs and interconnecting DRUs.

The DAUs have the capability to control the gain (in small increments over a wide range) of the downlink and uplink signals that are transported between the DAU and the base station (or base stations) connected to that DAU. This capability provides flexibility to simultaneously control the uplink and downlink connectivity of the path between a particular DRU (or a group of DRUs via the associated DAU or DAUs) and a particular base station sector.

Embodiments of the present invention use router tables to configure the networked DAUs. The local router tables establish the mapping of the inputs to the various outputs. Internal Merge blocks are utilized for the Downlink Tables when the inputs from an External Port and a PEER Port need to merge into the same data stream. Similarly, Merge blocks are used in the Uplink Tables when the inputs from the LAN Ports and PEER Ports need to merge into the same data stream.

The remote router tables establish the mapping of the inputs to the various outputs. Internal Merge blocks are utilized for the Downlink Tables when the inputs from a LAN Port and a PEER Port need to merge into the same data stream. Similarly, Merge blocks are used in the Uplink Tables when the inputs from the External Ports and PEER Ports need to merge into the same data stream.

As shown in FIG. 1, the individual base station sector's radio resources are transported to a daisy-chained network of DRUs. Each individual sector's radio resources provide coverage to an independent geographical area via the networked DRUs. FIG. 1 demonstrates how three cells, each cell comprising an independent network of 7 DRUs, provide coverage to a given geographical area. A server is utilized to control the switching function provided in the DAS network.

Referring to FIG. 1 and by way of example, DAU 1 (102) receives downlink signals from BTS Sector 1 (101). DAU 1 translates the RF signals to optical signals and the optical fiber cable 103 transports the desired signals to DRU 2 (104). Optical cable 105 transports all the optical signals to DRU 3 (106). The other DRUs in the daisy chain are involved in passing the optical signals onward to DRU 1 (107). DAU 1 (102) is networked with DAU 2 (108) to allow the downlink signals from Sector 2 (109) and Sector 3 (110) to be transported to all the DRUs in Cell 1. The system's switching and routing functions enable the selection of which sectors' signals are transmitted and received by each DRU.

An embodiment illustrating a Traffic monitoring unit (121) at the DAUs is included to track the traffic load at each DAU in the network. The traffic load associated with each DAU is collected and stored in the Network Optimization Unit (120). The optimization unit (120) calculates the overall DAS network performance and determines the optimum reconfigured network to improve or maximize performance. Utilizing the traffic monitoring unit 121 in conjunction with the DAUs provides for optimization of the DAS network through a traffic monitoring unit external to the DAUs. Thus, embodiments of the present invention provide for traffic monitoring in a DAS network. Optimization of the DAS network can then be performed using information related to the traffic monitoring.

Referring to FIG. 1, the traffic monitor unit 121 can be a server determining the number of users on each DAU, with each DAU having multiple ports in some embodiments. Data from the traffic monitor unit 121 is then provided to the network optimization unit 120, which can be the same server including the traffic monitor unit or a different server. The network optimization unit 120 (which can be software running on a server) can model the rebalancing of the traffic load and, after determining that the performance will be acceptable, implements the load rebalancing by communicating with the DAUs and shifting traffic between sectors. Although the network optimization unit 120 is illustrated as coupled to the DAUs in FIG. 1, this is not required by embodiments of the present invention and the network optimization could be performed at one of the DRUs, with data regarding network optimization being transmitted back to the DAUs using, for example, using an Ethernet backhaul connecting the DRUs to the DAUs. Thus, the network optimization server could be located at one of the DRUs, controlling the entire network from that location. One of ordinary skill in the art would recognize many variations, modifications, and alternatives.

The network optimization unit can implement a network optimization goal, which may relate to the number of users per sector, for example, that each sector carry a percentage of traffic less than 50% of the total traffic, less than 40% of the total traffic, or less than 35% of the total traffic, that each sector have less than 50% of the users, less than 40% of the users, less than 35% of the users, or that each sector have 33% of the users, or the like. Thus, the optimization goals can include metrics of the system performance. Although the system may not reach the goals, progress toward the goals can be provided, improving the user experience.

Figure 2:
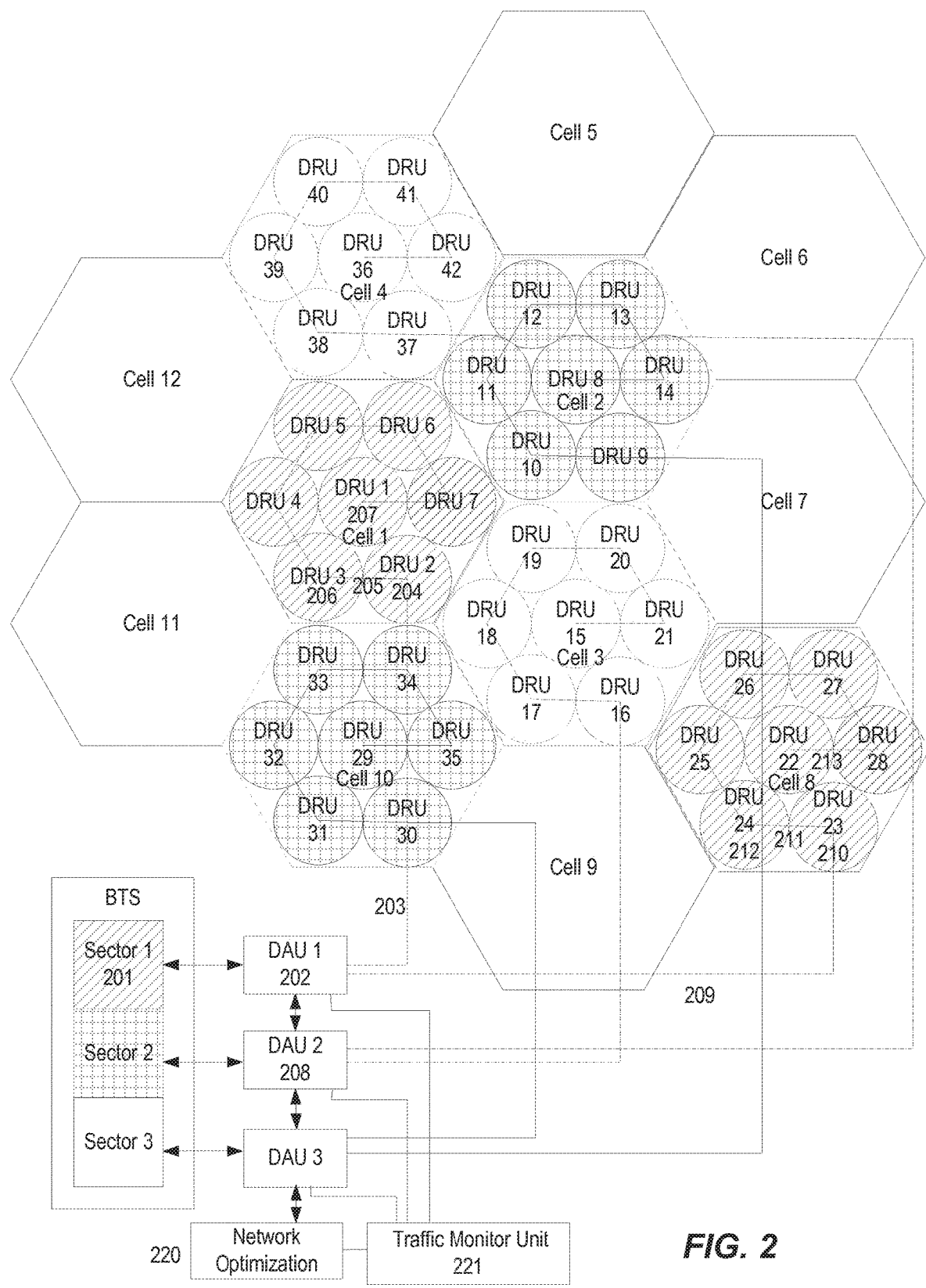
FIG. 2 is a block diagram according to one embodiment of the invention showing the basic structure for a frequency reuse pattern of N=1 and an example of the transport routing, traffic monitoring and network optimization based on having a single 3 sector BTS with 3 DAUs and 7 DRUs daisy chained together for each cell.

FIG. 2 shows an embodiment illustrating how a single base station can be used to provide coverage for a larger geographical area when a frequency reuse pattern of N=1 is used. Referring to FIG. 2, cell 1 and cell 8 would share the radio resources of sector 1 of the base station. Similarly, cell 2 and cell 10 would share the radio resources of sector 2.

The DAUs control the routing of data between the base station and the DRUs. Each individual data packet is provided with a header that uniquely identifies which DRU it is associated with. The DAUs are interconnected to allow transport of data among multiple DAUs. This feature provides the unique flexibility in the DAS network to route signals between the sectors and the individual DRUs. A server is utilized to control the switching function provided in the DAS network. Referring to FIG. 2, and by way of example, DAU 1 (202) receives downlink signals from BTS 1 Sector 1 (201). DAU 1 translates the RF signals to optical signals and the optical fiber cable 203 transports the desired signals to DRU 2 (204). Optical cable 205 transports all the optical signals to DRU 3 (206). The other DRUs in the daisy chain are involved in passing the optical signals onward to DRU 1 (207). DAU 1 (202) is networked with DAU 2 (208) to allow the downlink signals from Sector 2 and Sector 3 to be transported to all the DRUs in Cell 1. Optical fiber cable 209 transports the desired signals to DRU 23 (210). Optical cable 211 transports all the optical signals to DRU 24 (212). The other DRUs in the daisy chain are involved in passing the optical signals onward to DRU 22 (213). An embodiment illustrating a Traffic monitoring unit (221) at the DAUs is included to track the traffic load at each DAU in the network. The traffic load associated with each DAU is collected and stored in the Network Optimization Unit (220). The optimization unit (220) calculates the overall DAS network performance and determines the optimum reconfigured network to maximize performance.

Figure 3:
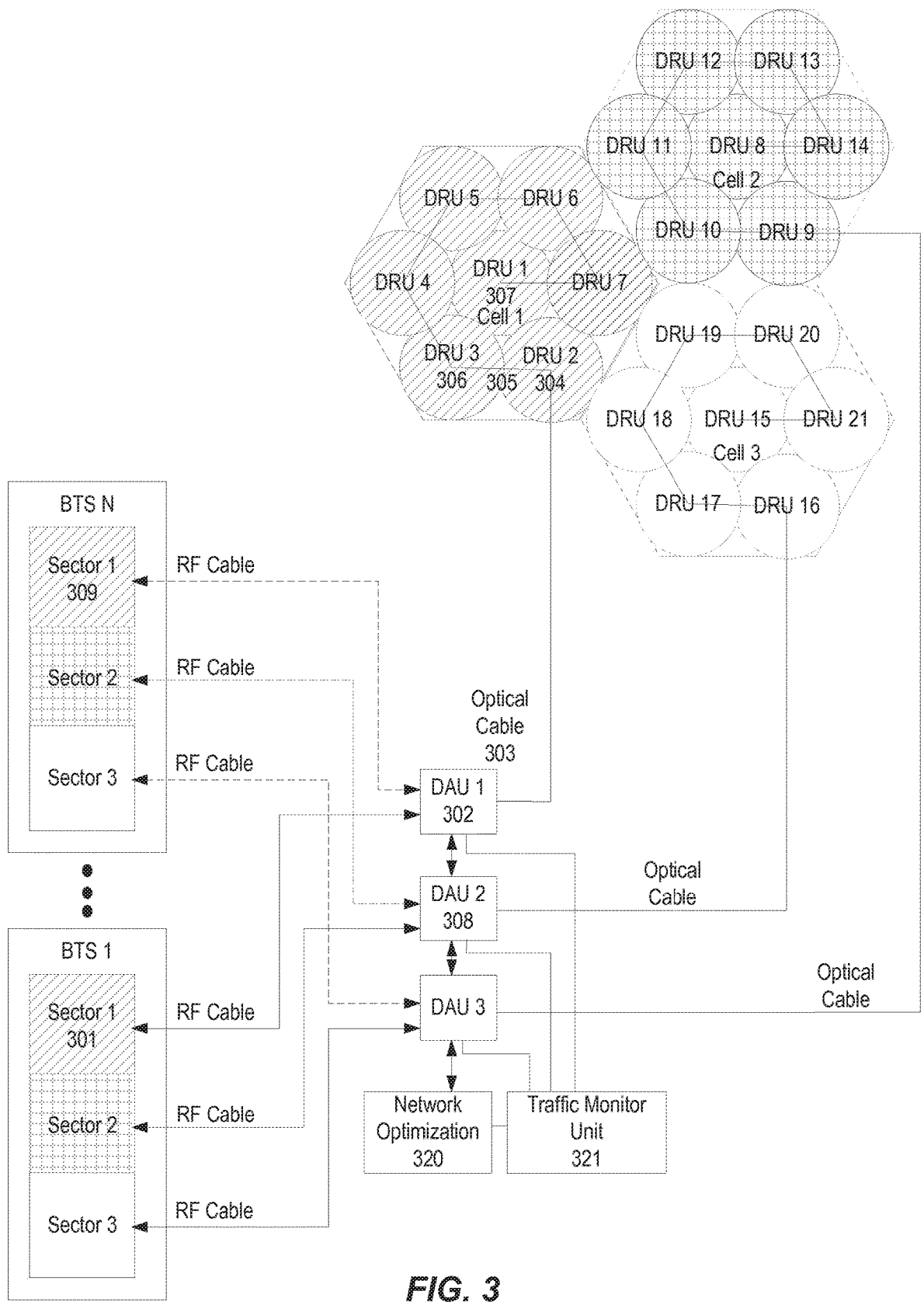
FIG. 3 is a block diagram according to one embodiment of the invention showing the basic structure and an example of the transport routing, traffic monitoring and network optimization based on having multiple 3 sector BTSs with 3 DAUs and 7 DRUs daisy chained together for each cell. In this embodiment, multiple three sector base stations are connected to a daisy chained DAS network.

FIG. 3 shows an embodiment illustrating an application employing a base station hotel where N BTSs are interconnected to serve a given geographical area. The base stations may represent independent wireless network operators and/or multiple standards (WCDMA, LTE, etc.) or they may represent provision of additional RF carriers. The base station signals may be combined before they are connected to a DAU, as may be the case for a Neutral Host application. Referring to FIG. 3 and by way of example, DAU 1 (302) receives downlink signals from BTS Sector 1 (301). DAU 1 translates the RF signals to optical signals and the optical fiber cable 303 transports the desired signals to DRU 2 (304). Optical cable 305 transports all the optical signals to DRU 3 (306). The other DRUs in the daisy chain are involved in passing the optical signals onward to DRU 1 (307). DAU 1 (302) is networked with DAU 2 (308) to allow the downlink signals from BTS 1 Sector 2 to be transported to all the DRUs in Cell 1. DAU 1 (302) receives downlink signals from BTS Sector N (309). DAU 1 translates the RF signals to optical signals and the optical fiber cable 303 transports the desired signals to DRU 2 (304). Optical cable 305 transports all the optical signals to DRU 3 (306). The other DRUs in the daisy chain are involved in passing the optical signals onward to DRU 1 (307). The additional base stations provide the capability to add capacity for Cell 1.

In order to efficiently utilize the limited base station resources, the network of DRUs should have the capability of re-directing their individual uplink and downlink signals to and from any of the BTS sectors. Because the DRUs data traffic has unique streams, the DAU Router has the mechanism to route the signal to different sectors. An embodiment illustrating a Traffic monitoring unit (321) at the DAUs is included to track the traffic load at each DAU in the network. The traffic load associated with each DAU is collected and stored in the Network Optimization Unit (320). The optimization unit (320) calculates the overall DAS network performance and determines the optimum reconfigured network to maximize performance.

Figure 4:
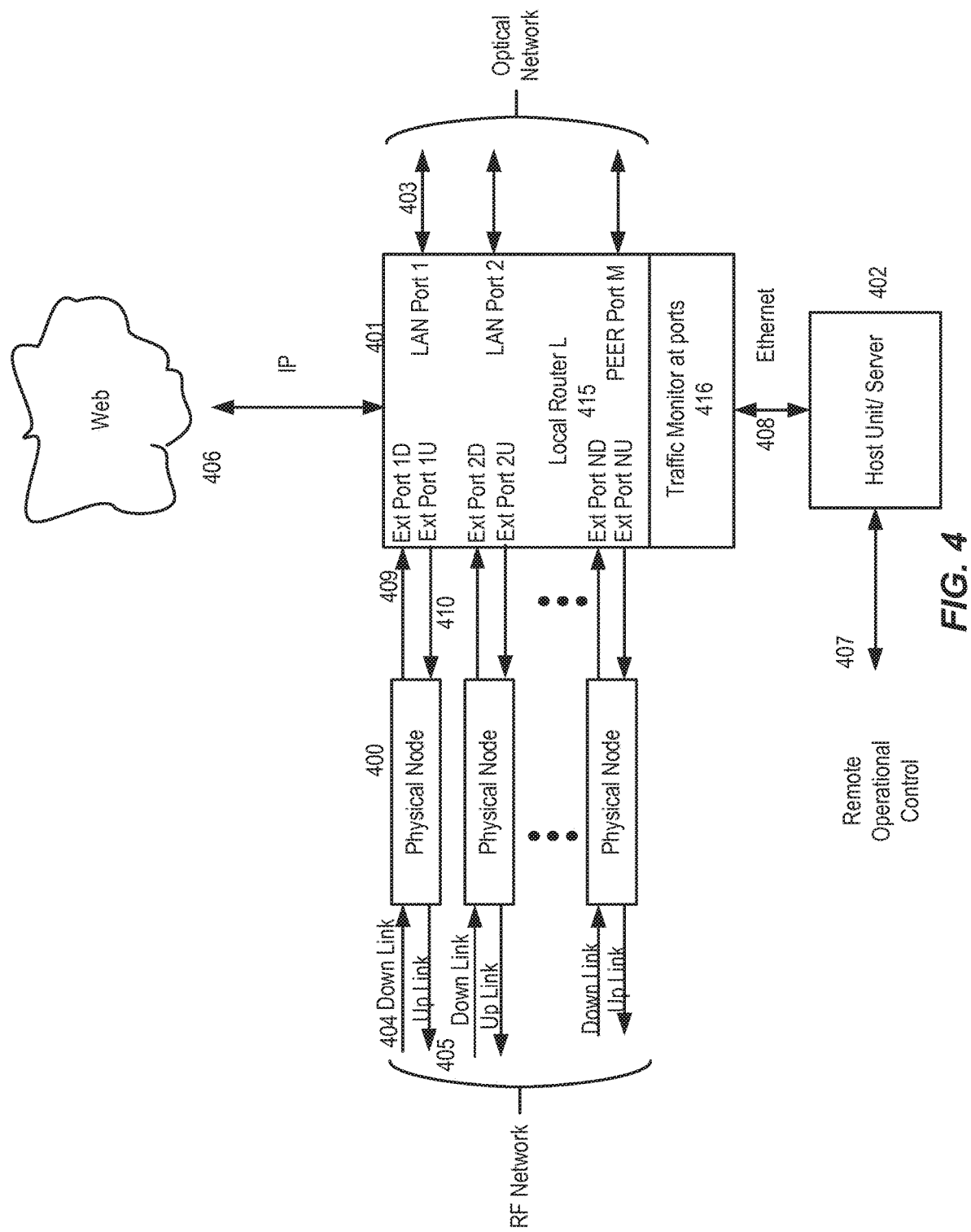
FIG. 4 is a block diagram of a Digital Access Unit (DAU), which contains Physical Nodes, a Local Router, and Port Traffic Monitoring capability according to an embodiment of the present invention.

FIG. 4 shows the two primary elements in a DAU, the Physical Nodes (400) and the Local Router (401). The Physical Nodes translate the RF signals to baseband for the Downlink and from baseband to RF for the Uplink. The Local Router directs the traffic between the various LAN Ports, PEER Ports and the External Ports. The physical nodes connect to the BTS at radio frequencies (RF). The physical nodes can be used for different operators, different frequency bands, different channels, or the like. The physical nodes can combine the downlink and uplink signals via a duplexer or they can keep them separate, as would be the case for a simplex configuration. In one embodiment, Traffic monitoring (416) capability is provided in each DAU for determining the traffic load at each of the DAU ports. In this embodiment, the traffic monitoring function is performed in each DAU in comparison with other implementations in which the traffic monitoring is performed externally.

FIG. 4 shows an embodiment whereby the physical nodes have separate outputs for the uplinks (405) and separate inputs for the downlink paths (404). The physical node translates the signals from RF to baseband for the downlink path and from baseband to RF for the uplink path. The physical nodes are connected to a Local Router via external ports (409,410)). The router directs the uplink data stream from the LAN and PEER ports to the selected External U ports. Similarly, the router directs the downlink data stream from the External D ports to the selected LAN and PEER ports.

In one embodiment, the LAN and PEER ports are connected via an optical fiber to a network of DAUs and DRUs. The network connection can also use copper interconnections such as CAT 5 or 6 cabling, or other suitable interconnection equipment. The DAU is also connected to the internet network using IP (406). An Ethernet connection (408) is also used to communicate between the Host Unit and the DAU. The DRU can also connect directly to the Remote Operational Control center (407) via the Ethernet port.

Figure 5:
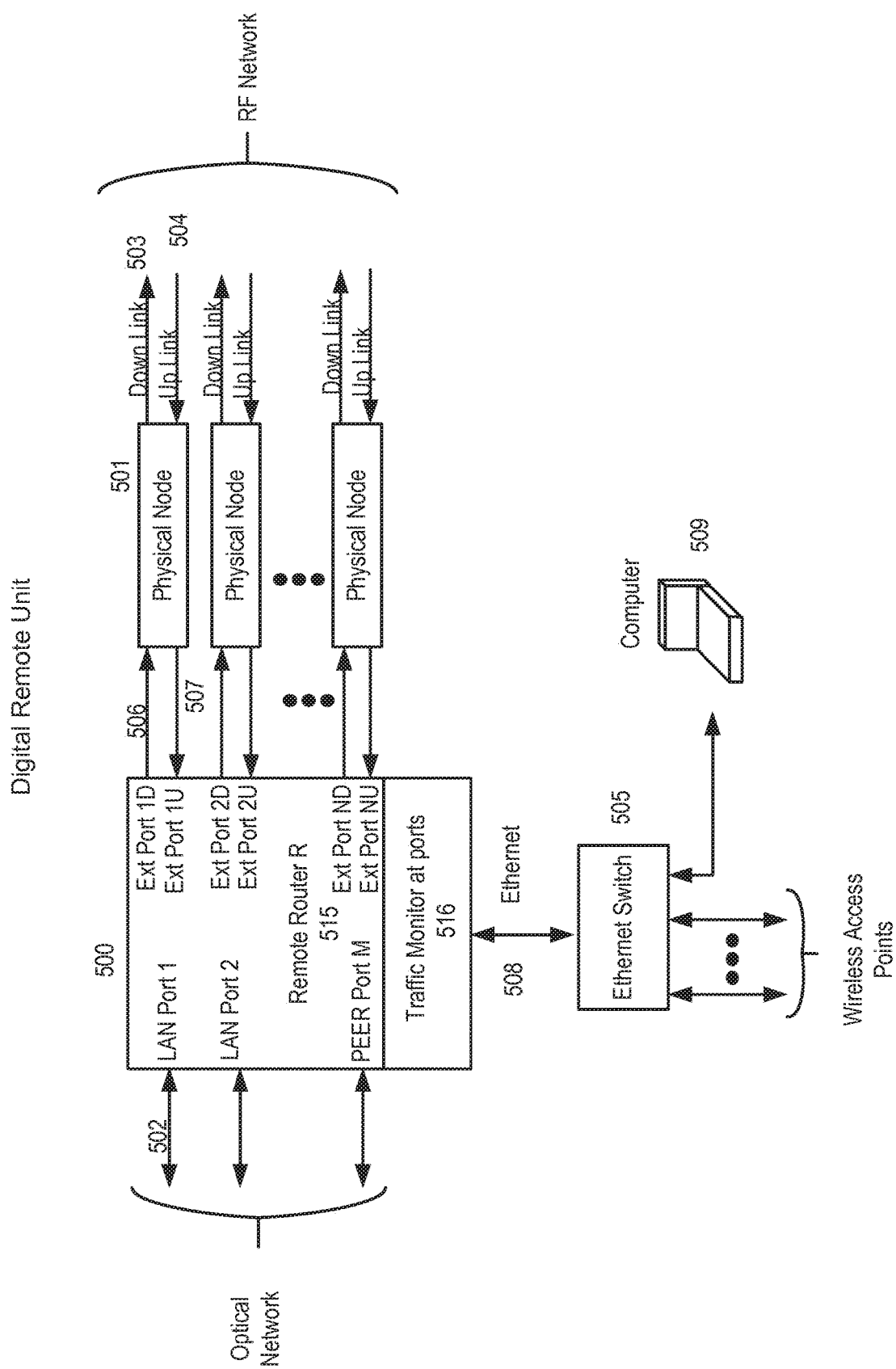
FIG. 5 is a block diagram of a Digital Remote Unit (DRU), which contains Physical Nodes, a Remote Router, and Port Traffic Monitoring capability according to an embodiment of the present invention.

FIG. 5 shows the two primary elements in a DRU, the Physical Nodes (501) and the Remote Router (500). The DRU includes both a Remote Router and Physical Nodes. The Remote Router directs the traffic between the LAN ports, External Ports and PEER Ports. The physical nodes connect to the BTS at radio frequencies (RF). The physical nodes can be used for different operators, different frequency bands, different channels, etc. FIG. 5 shows an embodiment whereby the physical nodes have separate inputs for the uplinks (504) and separate outputs for the downlink paths (503). The physical node translates the signals from RF to baseband for the uplink path and from baseband to RF for the downlink path. The physical nodes are connected to a Remote Router via external ports (506,507). The router directs the downlink data stream from the LAN and PEER ports to the selected External D ports. Similarly, the router directs the uplink data stream from the External U ports to the selected LAN and PEER ports. The DRU also contains a Ethernet Switch (505) so that a remote computer or wireless access points can connect to the internet.

In one embodiment, the traffic monitoring (516) capability is provided in each DRU for determining the traffic load at each of the DRU ports. In this embodiment, the traffic monitoring function is performed in each DRU in comparison with other implementations in which the traffic monitoring is performed externally.

Figure 6:
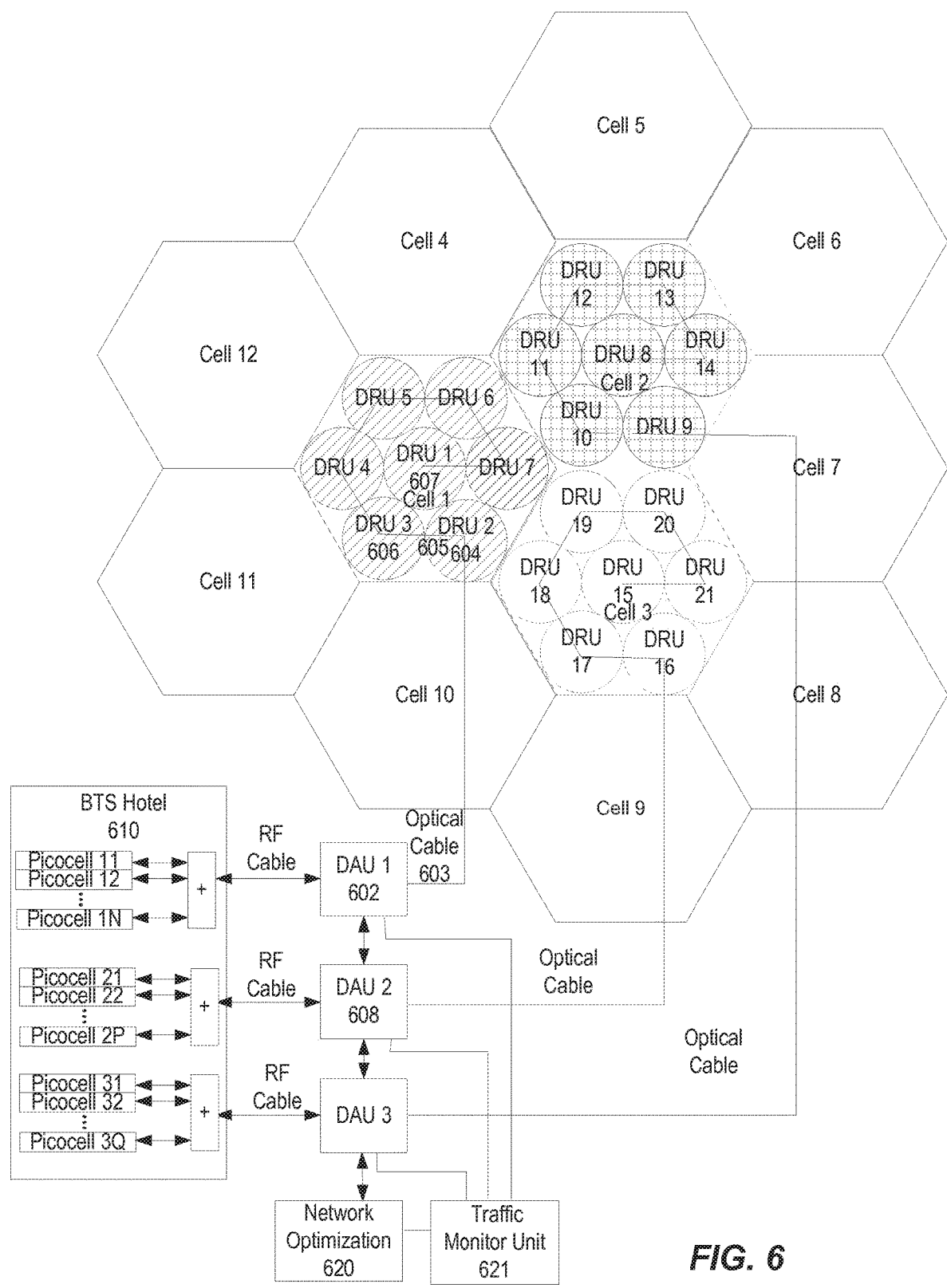
FIG. 6 depicts a typical topology where multiple Local Routers are interconnected with multiple Remote Routers along with Traffic monitoring and Network Optimization functionality according to an embodiment of the present invention.

As shown in FIG. 6, the base station hotel (610) is comprised of multiple Picocells. The Picocells are typically wireless operator dependent and frequency band dependent. Picocells that operate in the same frequency band are combined at RF and input to the respective DAUs. The DAU radio resources from the combined Picocells are transported to a daisy-chained network of DRUs. Each individual DAUs radio resources provide coverage to an independent geographical area via the networked DRUs. FIG. 6 demonstrates how multiple DAUs, each cell comprising an independent network of 7 DRUs, provide coverage to a given geographical area. In one embodiment, the traffic monitoring functionality is located in an external Traffic Monitoring Unit (621), which is connected to the network of DAUs.

Figure 7:
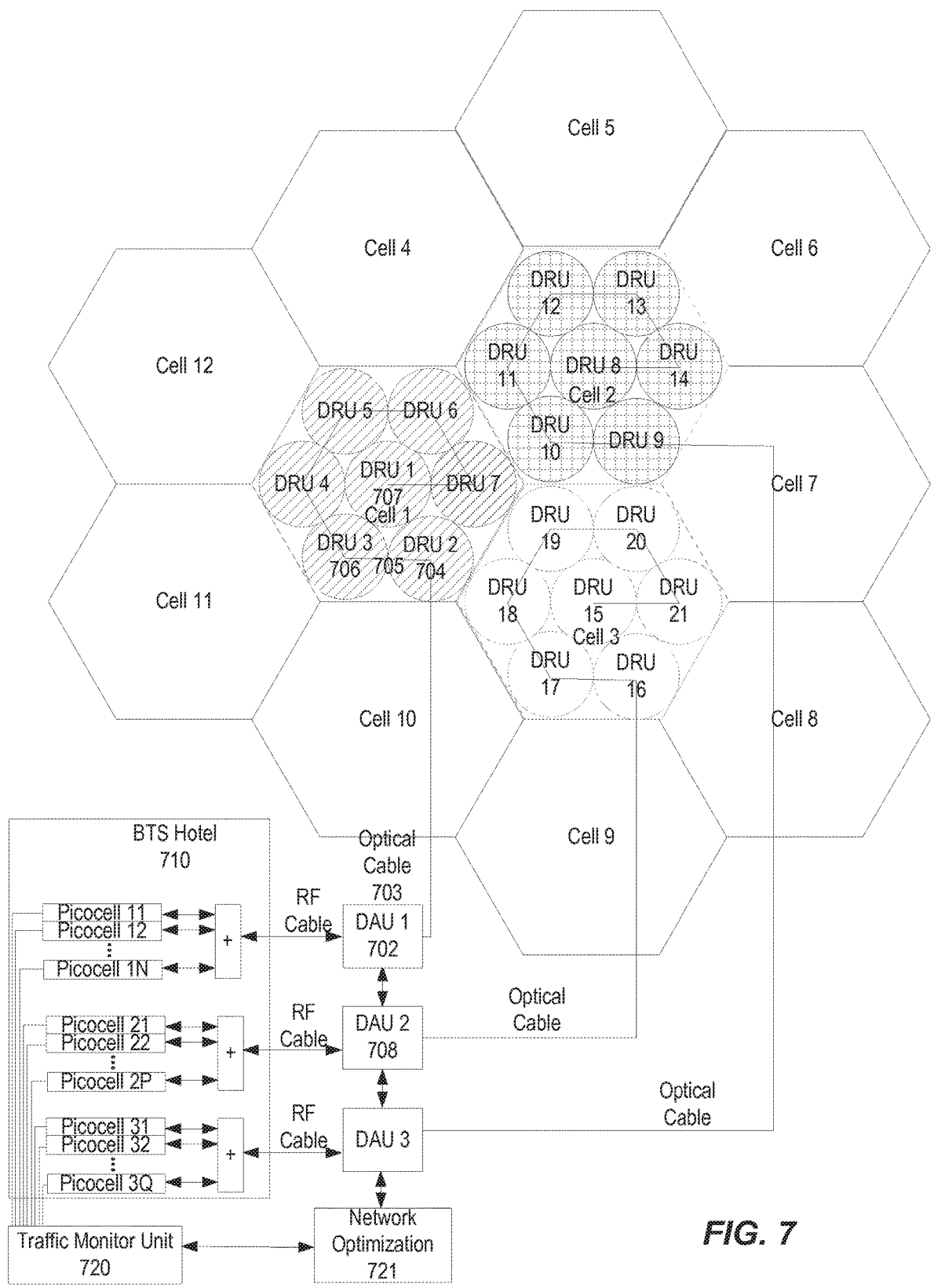
FIG. 7 depicts a typical topology where multiple Local Routers are interconnected with multiple Remote Routers along with Traffic monitoring at each Picocell and Network Optimization functionality according to an embodiment of the present invention.

As shown in FIG. 7, the base station hotel (710) is comprised of multiple Picocells. The Picocells are typically wireless operator dependent and frequency band dependent. Picocells that operate in the same frequency band are combined at RF and input to the respective DAUs. The DAU radio resources from the combined Picocells are transported to a daisy-chained network of DRUs. Each individual DAUs radio resources provide coverage to an independent geographical area via the networked DRUs. FIG. 7 demonstrates how multiple DAUs, each cell comprising an independent network of 7 DRUs, provide coverage to a given geographical area. In one embodiment, the traffic monitoring functionality is located in an external Traffic Monitoring Unit (721), which is connected to the Picocells. The BTS Hotel 710 includes a plurality of Picocells that are coupled to traffic monitoring unit 720. The traffic information flows from the Picocells to the traffic monitoring unit, which uses this traffic information to optimize the DAS network. The traffic monitoring unit 820 works in conjunction with network optimization unit 721, which can include traffic management algorithms used to distribute traffic efficiently throughout the DAS network.

Figure 8:
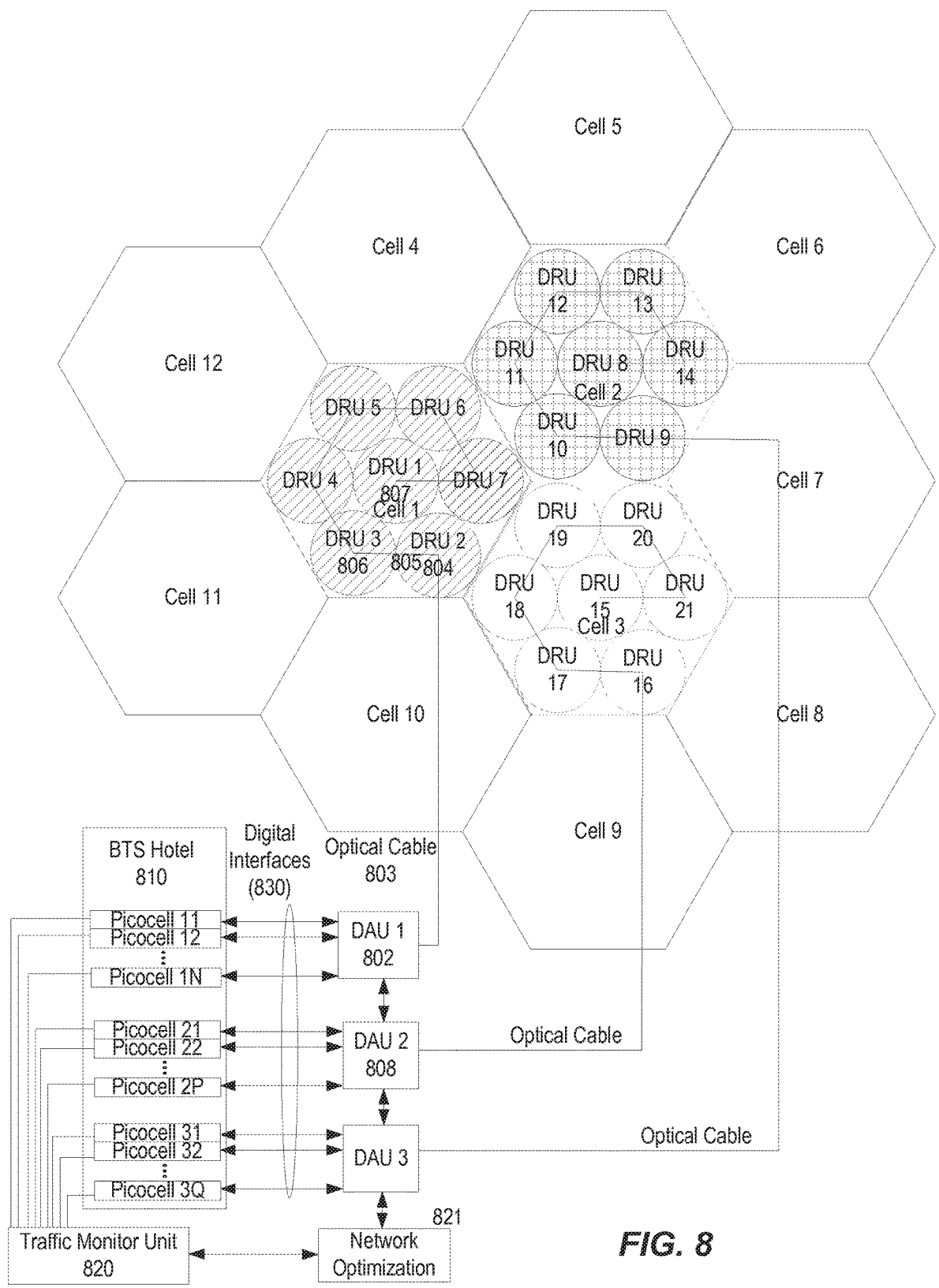
FIG. 8 depicts a typical topology where multiple Local Routers are interconnected with multiple Remote Routers along with Traffic monitoring at each Picocell and Network Optimization functionality according to an embodiment of the present invention.

FIG. 8 shows an embodiment of a base station hotel (810), which is comprised of multiple picocells that are interconnected to a network of DAUs via a digital interface (830).

Figure 9:
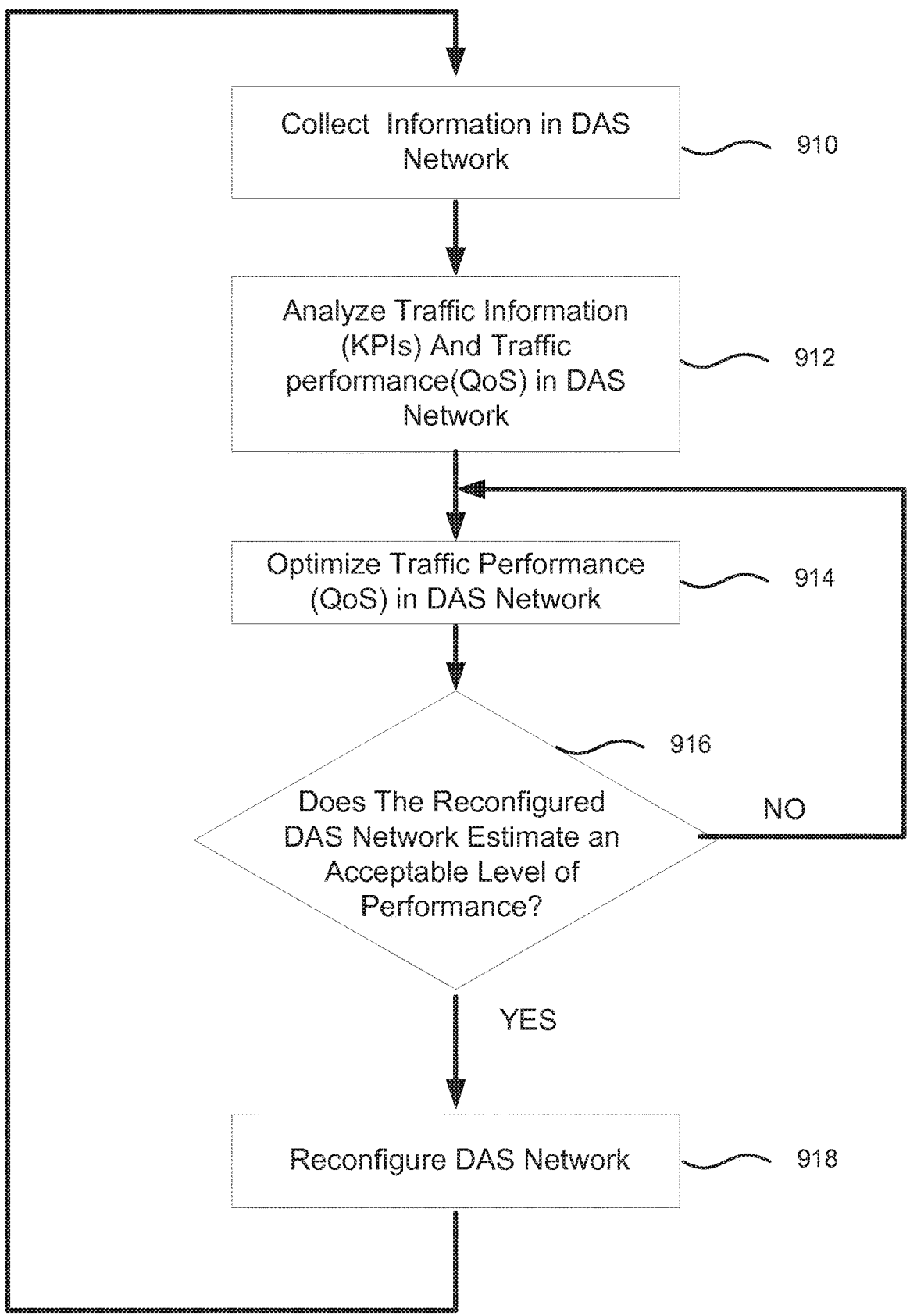
FIG. 9 is a simplified flowchart illustrating a method of optimizing the DAS network according to an embodiment of the present invention.

FIG. 9 illustrates one embodiment of the DAS network optimization flow diagram. The Key Performance Indicators (KPIs) of the network traffic are collected at the various network nodes (910). KPI may comprise information such as: number of blocked calls, number of active calls, average power of uplink channels, average power of downlink channels, traffic on each sector, failed calls, number of satisfied users, number of unsatisfied users, number of users operating through a given DRU, and the like.

The DAS network performance is then analyzed in the context of the available DAS network radio resources (912). An optimization algorithm is applied to the existing DAS network with the objective to determine the optimum routing of network traffic (914). Once an optimum DAS network has been determined then an estimate of the reconfigured DAS network performance is determined (916). The reconfigured DAS network is evaluated prior to an implementation to insure that the performance will be acceptable. If the reconfigured DAS network has been determined to be acceptable then the reconfigured DAS network is implemented (918) and the entire process is repeated. In an embodiment, the load on the sectors prior to reconfiguration and after the proposed reconfiguration can be compared to determine if the shifting of the DRUs to the other sectors improves the system performance.

Thus, using the KPIs of the network traffic, the DAS network can be modified to improve system performance. As an example, if a particular DRU has a higher load than other adjacent DRUs, traffic can be routed to the adjacent DRUs in order to reduce the load on the particular DRU. Additional description related to load balancing is provided in U.S. Patent Application No. 61/600,530, filed on Feb. 17, 2012, entitled "Evolutionary Algorithms for Geographic Load Balancing Using a Distributed Antenna System," the disclosure of which is hereby incorporated by reference in its entirety for all purposes.

As an example of optimizing network performance, a base station typically has three sectors. The DRU can be allocated to different sectors in order to improve performance by shifting traffic from a first sector (e.g., a high traffic sector) to a second sector (e.g., a low traffic sector) by shifting a DRU allocated to the first sector to the second sector. Although some embodiments of the present invention will not optimize performance of the system, the system performance can be improved using the techniques described herein, for example, by measuring the traffic load on the DRUs, performing load balancing of the traffic on the DRUs, to reduce the load on a first DRU characterized by a first traffic load by shifting the load to a second DRU characterized by a second traffic load less than the first traffic load. In the optimization process, system performance can be measured against a predetermined threshold, with the optimization process terminating once the predetermined threshold has been reached. One of ordinary skill in the art would recognize many variations, modifications, and alternatives.

As another example, power settings for the DRUs can be modified to improve system performance as discussed in additional detail in U.S. Patent Application No. 61/669,572, filed on Jul. 9, 2012 and entitled, "A Self-Optimizing Distributed Antenna System Using Soft Frequency Reuse," the disclosure of which is hereby incorporated by reference in its entirety for all purposes.

Figure 10:
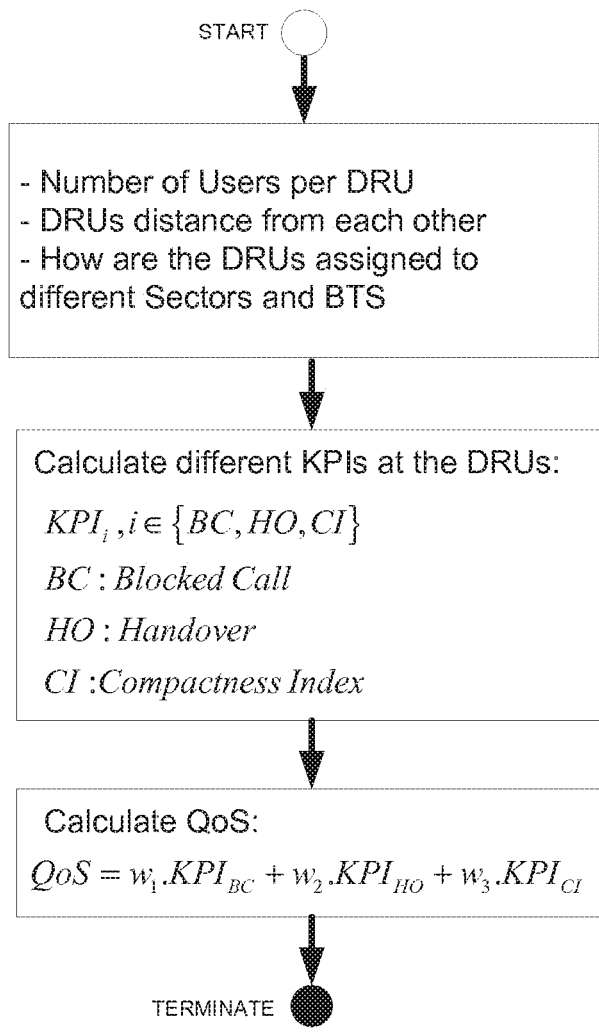
FIG. 10 is a simplified flowchart illustrating a method of calculating KPIs and QoS for a DAS network according to an embodiment of the present invention.

FIG. 10 illustrates one embodiment of the DAS network calculation of the KPIs and QoS. The important parameters for determining the DAS network QoS include the number of users allocated to a given DRU, the spatial distance between the various DRUs, as well as identifying which DRUs are assigned to which BTS sector.

Figure 11:
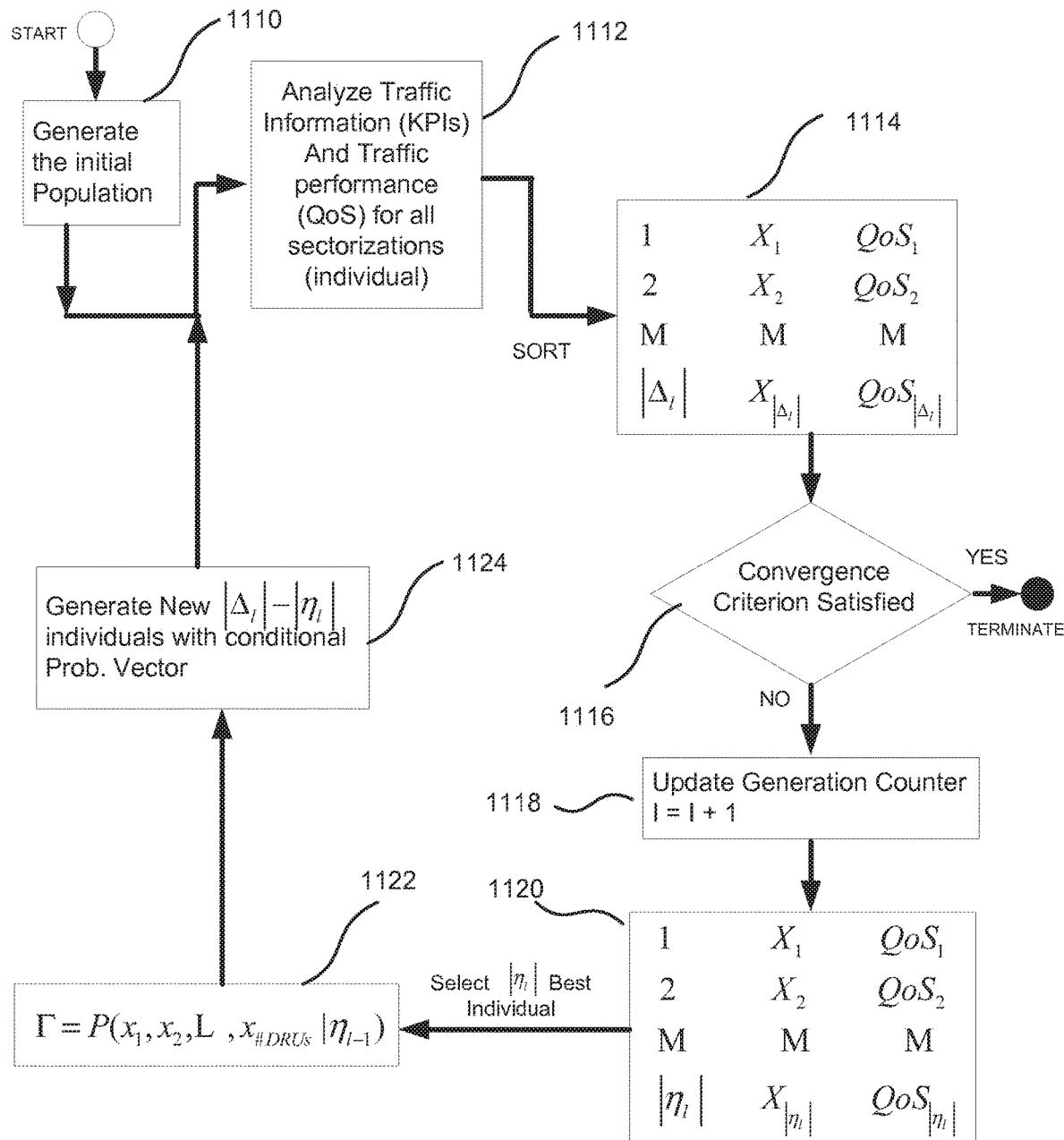
FIG. 11 is a simplified flowchart illustrating an optimization algorithm according to an embodiment of the present invention.

FIG. 11 illustrates one embodiment of the flow chart for the optimization algorithm. In this embodiment an Estimation Distribution Algorithm (EDA) is used. Various DRU allocation scenarios are investigated to determine the optimum DRU scenario that achieves the highest QoS. In an embodiment, the initial population is generated (1110). The traffic information (KPIs) is analyzed and traffic performance (QoS) for all sectorization is analyzed (1112). A sort procedure is performed (1114) and a determination is made if the convergence criterion are satisfied (1116). If so, the process is terminated. If not, then the generation counter is updated (1118), a sort operation is performed (1120), the parameter V is computed (1122) and a new population is generated (1124). Then the method proceeds to the traffic information and performance analysis (1112).

Network Optimization

The network's performance (expressed by the number of KPIs from different parts of the network) determines the QoS values. Different operators may have different defined business goals and different services of interest. Based on these considerations, efficient and cost effective network performance management varies from operator to operator. Therefore, QoS metrics could be defined and mapped to a set of KPIs. When a set of KPIs is used, then the mapping needs to be represented by a weighted normalized function.

In this section we formulate the sectorization problem with mixed integer programming to balance traffic among sectors and to minimize handoffs with connected and compact sectors. Given the sectorization of DRUs at time period t, our problem is to obtain new sectorization at time period t+1 that adaptively balances the change in traffic demands.

In order to formulate the problem, we consider a service coverage area with N DRUs. Each DRU is assumed to have traffic demand $T_i$ i=1, ..., N. Note that, $UE_A$ belongs to $DRU_B$ if the received uplink power from $UE_A$ at $DRU_B$ is greater than the other DRUs. Let $p_{ij}$ be the transition probability of mobiles from $DRU_i$ to $DRU_j$. Then, the handoff calls from $DRU_i$ to $DRU_j$ become $h_{ij}=p_{ij}T_i$. The distance between $DRU_i$ and $DRU_j$ is inversely proportional to $p_{ij}$. Assume that an eNodeB hotel has M VBSs. Let $SOS_m$ and $SOD_k$ be the set of sectors in $VBS_m$ and the set of DRUs allocated to $Sector_k$, respectively, such that $|SOS_m|=3$ (if each eNodeB/VBS has three sectors), m=1, ..., M and k=1, ..., K. We consider the following three cost factors (KPIs) in the sectorization problem:

$KPI_{BC}$ (Inverse of the Number of Blocked Calls):

The penalty of the blocked calls caused by hard capacity and soft capacity. Let $HC_m$ and $SC_k$ be the hard capacity of $VBS_m$ and soft capacity of $Sector_k$ respectively such that $$HC_m = \sum_{k \in SOS_m} SC_k.$$

The binary variable $x_{ik}=1$, when $DRU_i$ belongs to $Sector_k$.

$$y_{im} = \sum_{k \in SOS_m} x_{ik},$$

then $y_{im}=1$ when $DRU_i$ belongs to $VBS_m$.

$$sc_k = \begin{cases} 0 & \text{if } \sum_i T_i x_{ik} < SC_k \\ \sum_i T_i x_{ik} - SC_k & \text{otherwise} \end{cases} \quad (1)$$

$$hc_m = \sum_i T_i y_{im} - HC_m = \sum_i T_i \sum_{k \in SOS_m} x_{ik} - \sum_{k \in SOS_m} SC_k$$

$$= \sum_{k \in SOS_m} \sum_i T_i x_{ik} - SC_k$$

$$= \sum_{k \in SOS_m} SC_k$$

Since a penalty occurs only when the calls are blocked, we apply just $sc_k$ to the objective function, because the $hc_m$ is a function of $sc_k$ and there is no need to add it as another term to the objective function. $sc_k$ is a nonnegative real variable. So, $$KPI_{BC} = \left[ \sum_{k \in SOS_m} sc_k \right]^{-1} \quad (2)$$

$KPI_{HO}$ (Inverse of the number of Handoffs): we consider three different types of Handoffs:

A. Inter-eNodeB Handoff.

When user equipment (UE) with an ongoing call moves from one VBS to another VBS, then the UE needs an inter-eNodeB handoff. Inter-eNodeB handoff is executed using the X2 interface (as long as the UE does not leave the LTE coverage area) or S1 interface (when the UE leaves the serving cell). The X2 handoff includes establishing a signaling connection using the X2 Application Part (X2AP) from the source to the target eNodeB. The target eNodeB updates the MME (Mobility Management Entity) with the new geographic position of the UE. To enable this procedure, the MME needs to communicate with S-GW (Serving Gateway) to negotiate the new endpoint. During the S1 handoff, the MME receives the relocation preparation request of the source eNodeB, it starts the handoff resource allocation procedure to request the necessary radio resource from the target eNodeB. After the target eNodeB sends the required radio interface parameters embedded in a handoff command message; the MME forwards this handoff command message transparently to the UE, which executes the handoff. The main procedure is triggered by the MME and executed by S-GW.

Let the binary variable $z_{ijm}=1$, when $DRU_i$ and $DRU_j$ belong to $VBS_m$. Then the inter-eNodeB handoff cost is computed by using the variable $$z_{ij} = 1 - \sum_m z_{ijm},$$

the cost becomes $$\sum_i \sum_j h_{ij} z_{ij}.$$

Note that inter-eNodeB handoff occurs when $DRU_i$ and $DRU_j$ belong to different VBS, i.e., $z_{ijm}=0$.

B. Intra-eNodeB Handoff:

When a UE with an ongoing call moves from one sector to another in a VBS, then the mobile needs an intra-eNodeB handoff. This procedure doesn't need to involve MME or S-GW because it can be handled entirely within that VBS. Now by letting the binary variable $w_{ijk}=1$ when $DRU_i$ and $DRU_j$ belong to sector k, the intra-eNodeB handoff cost is computed by using two variables $w_{ij}-z_{ij}$ where $$w_{ij} = 1 - \sum_k w_{ijk},$$

the cost becomes $$\sum_i \sum_j h_{ij}(w_{ij} - z_{ij}).$$

An intra-eNodeB handoff occurs when $DRU_i$ and $DRU_j$ belong to different sectors of the same VBS.

C. Forced Handoff:

When a DRU changes its sector, all ongoing calls in the cell have to change their pilot PN offsets for WCDMA. The cost of forced handoff is computed by employing the current sectorization $a_{ik}$, which is equal to zero when $DRU_i$ is in $Sector_k$. Since the cost occurs when $DRU_i$ currently in another sector moves into $Sector_k$, the cost becomes $$\sum_i \sum_k a_{ik} T_i x_{ik}.$$

The weighted combination of these three handoff cost would be:

$$KPI_{HO} = \left[ c_1 \sum_i \sum_j h_{ij} z_{ij} + c_2 \sum_i \sum_j h_{ij}(w_{ij} - z_{ij}) + c_3 \sum_i \sum_k a_{ik} T_i x_{ik} \right]^{-1} \quad (3)$$

$KPI_{CI}$ (Inverse of the Compactness Index): we will try to minimize the length of handoff border with the compactness index CI which is introduced in Section II.B. In Equation (4) the numerator term represents the number of handoff DRU sides between two different sectors.

$$KPI_{CI} = [CI]^{-1} = \left[ \frac{\sum_i \sum_{i<j} w_{ij} B_{ij}}{\sum_i \sum_{i<j} B_{ij}} \right]^{-1} \quad (4)$$

Where $B_{ij}=1$, if $DRU_i$ and $DRU_j$ are adjacent.

Now we consider the following constraints required in the formulation:

1. each DRU has to belong to a sector, that is, $$\sum_k x_{ik} = 1 \text{ for all } i \quad (5)$$

2. The relationship between any two DRUs in a $Sector_k$ has to satisfy $w_{ijk}=1$ if and only if $x_{ik}=x_{jk}=1$. Thus we have:

$w_{ijk} \leq x_{ik}, w_{ijk} \leq x_{jk}$ and $w_{ijk} \geq x_{ik} + x_{jk} - 1$ for all $i,j$ and $k$ (6)

The relationship between two DRUs in a $VBS_m$. $z_{ijm}=1$ if and only if $y_{im}=y_{jm}=1$ which leads to:

$z_{ijm} \leq y_{im}, z_{ijm} \leq y_{jm}$ and $z_{ijm} \geq y_{im}+y_{jm}-1$ for all $i,j$ and $k$ (7)

3. Connected sectorization, if a sector has more than one DRU, then the DRUs of the sector have to be connected. For the formulation of connected sectors we employ the cut theorem [26] on $SOD_k$. If $Sector_k$ is connected, then any cut that separates cells in $SOD_k$ has at least one common side of the hexagonal cells. Let $S1_k$ be a proper subset of $SOD_k$, that is, $S1_k \subset SOD_k$, $S1_k \neq \phi$, and $S1_k \neq SOD_k$. Also let $S2_k$ be the opposite set of $S1_k$, that is, $S2_k = SOD_k - S1_k$. Because two subsets are connected, there exists at least one common side of the DRUs separated by the subsets. Thus we have $$\sum_{i \in S1_k} \sum_{j \in S2_k} B_{ij} \geq 1 \quad (8)$$

Now, our QoS function is the weighted combination of three KPIs (cost factors) which we have already introduced. Obviously our objective function is to maximize the QoS function. They are penalties of blocked calls by hard and soft capacities and handoff calls. The DRU sectorization can be formulated as the following mixed integer linear programming.

$$\text{Minimize } QoS^{-1} = w_1 \cdot KPI_{BC}^{-1} + w_2 \cdot KPI_{HO}^{-1} + w_3 \cdot KPI_{Cl}^{-1} \quad (9)$$

Subject to: $\sum_k x_{ik} = 1$ for all $i$ $w_{ijk} \leq x_{ik}, w_{ijk} \leq x_{jk}$ and $w_{ijk} \geq x_{ik} + x_{jk} - 1$ for all $i, j$ and $k$ $w_{ij} = 1 - \sum_k w_{ijk}$ for all $i, j$ $y_{im} = \sum_{k \in SOS_m} x_{ik}$ for all $m$ $z_{ijm} \leq y_{im}, z_{ijm} \leq y_{jm}$ and $z_{ijm} \geq y_{im} + y_{jm} - 1$ for all $i, j$ and $m$ $z_{ij} = 1 - \sum_k z_{ijk}$ for all $i, j$ $\sum_{i \in S1_k} \sum_{j \in S2_k} B_{ij} \geq 1$ for all $S1_k \subset SOD_k$ where $S1_k \neq \phi$ and $S1_k \neq SOD_k$ and $S2_k = SOD_k - S1_k$ $h_{ij} = p_{ij} T_i$ for all $i$ and $j$ $hc_m = \sum_i T_i y_{im} - HC_m$ for all $m$ $$sc_k = \begin{cases} 0 & \text{if } \sum_i T_i x_{ik} < SC_k \\ \sum_i T_i x_{ik} - SC_k & \text{otherwise} \end{cases} \text{ for all } k$$

$x_{ik}, w_{ijk}, z_{ijm}, P_k \in \{0, 1\}$ for all $i, j, k$ and $m$

Note that many grouping problems which are special cases of the sectorization problem are well-known NP-hard problems. Since our problem is NP hard, the time it takes to execute the algorithm is exponentially increasing with the size of the problem. Such an algorithm is thus in most cases unusable for real-world size problem. As an encouraging result on NP-hard problems, we investigate evolutionary algorithms to solve the sectorization problem and compare the performance with the solutions obtained by the mixed integer programming.

Estimation Distribution Algorithm (EDA)

Unlike other evolutionary algorithms, in EDA a new population of individuals in each generation is generated without crossover and mutation operators. Instead, in EDA a new population is generated based on a probability distribution, which is estimated from the best selected individuals of previous generation. We introduce each main-vector as an individual for our EDA approach, and also our fitness function is objective function that we mentioned it in section III. In general, conventional EDAs can be characterized by parameters and notations:

$$(I_s, F, \Delta_l, \eta_l, \beta_l, p_s, \Gamma, I_{Ter}) \quad (11)$$

where

1) $I_s$ is the space of all potential solutions (entire search space of individuals).
2) F denotes a fitness function.
3) $\Delta_l$ is the set of individuals (population) at the lth generation.
4) $\eta_l$ is the set of best candidate solutions selected from set $\Delta_l$ at the lth generation.
5) We denote $\beta_l = \Delta_l - \eta_l = \Delta_l \cap \eta_l^C$, where $\eta_l^C$ is the complement of $\eta_l$.

6) $p_s$ is the selection probability. The EDA algorithm selects $p_s |\Delta_l|$ individuals from set $\Delta_l$ to make up set $\eta_l$.
7) We denote by $\Gamma$ the distribution estimated from $\eta_l$ (the set of selected candidate solutions) at each generation.
8) $I_{Ter}$ are the maximum number of generation In conventional EDAs, each individual is designated by a string. A typical EDA is described in the following steps:

Step 0: Generate initial population $\Delta_0$. The initial population ($|\Delta_0|$ individuals) is typically obtained by sampling according the uniform (equally likely) distribution:

$$(\theta_1, \theta_2, L, \theta_n) = \prod_{i=1}^{n} p_i(\theta_i), \quad (12)$$

$i = 1, 2, \ldots, n$, and $p_i(\theta_i = S_{11}) =$ $p_i(\theta_i = S_{21}) = \ldots = p_i(\theta_i = S_{|SOS_M|M}) = \dfrac{1}{\sum_{n=1}^{M} |SOS_n|}$ For generation $l=1, 2 \ldots$, follow steps 1 through 6

Step 1: Evaluate the individuals in the current population $\Delta_{l-1}$ according to the fitness function F. Sort the candidate solutions (individuals in the current population) according to their fitness orders.

Step 2: If the best candidate solution satisfies the convergence criterion or the number of generation exceeds its limit $I_{Ter}$, then terminate; else go to step 3.

Step 3: Select the best $p_s \Delta_{l-1}$ candidate solutions (individuals) from current population $\Delta_{l-1}$. This selection is accomplished according to the sorted candidate solutions.

Step 4: Estimate the probability distribution $p(\theta_1, \theta_2, L, \theta_n)$ on the basis of $|\eta_{l-1}|$ best candidate solutions. We denote this estimation by $$= P(\theta_1, \theta_2, L, \theta_n | \eta_{l-1}) \quad (13)$$

Step 5: Generate new $|\Delta_{l-1}| - |\eta_{l-1}|$ individuals on the basis of this new estimated probability distribution $\Gamma$. Replace the bad $|\beta_{l-1}|$ individuals with newly generated $|\Delta_{l-1}| - |\eta_{l-1}|$ individuals.

Step 6: Go to step 1 and repeat the steps

We followed the steps of the above pseudo code for our EDA implementation. In our experimentation, for estimation (13), we used a simple scheme of estimating the marginal distributions separately and using product form $$= p(\theta_1, \theta_2, L, \theta_n | \eta_{l-1}) = \prod_{i=1}^{n} p_i(\theta_i | \eta_{l-1}) \quad (14)$$

$$= \prod_{i=1}^{n} \left( \frac{\sum_{j=1}^{|\eta_{l-1}|} \delta(x_i^j = \theta_i | \eta_{l-1})}{|\eta_{l-1}|} \right)$$

Where $\delta$ is an indicator function and it can be expressed as $$\delta(x_i^j = \theta | \eta_{l-1}) = \begin{cases} 1 & \text{if } x_i^j = \theta \\ 0 & \text{otherwise} \end{cases} \quad (15)$$

It is also understood that the examples and embodiments described herein are for illustrative purposes only and that various modifications or changes in light thereof will be suggested to persons skilled in the art and are to be included within the spirit and purview of this application and scope of the appended claims.

Appendix I is a glossary of terms used herein, including acronyms.

APPENDIX I

Glossary of Terms

ACLR Adjacent Channel Leakage Ratio
ACPR Adjacent Channel Power Ratio
ADC Analog to Digital Converter
AQDM Analog Quadrature Demodulator
AQM Analog Quadrature Modulator
AQDMC Analog Quadrature Demodulator Corrector
AQMC Analog Quadrature Modulator Corrector
BPF Bandpass Filter
CDMA Code Division Multiple Access
CFR Crest Factor Reduction
DAC Digital to Analog Converter
DET Detector
DHMPA Digital Hybrid Mode Power Amplifier
DDC Digital Down Converter
DNC Down Converter
DPA Doherty Power Amplifier
DQDM Digital Quadrature Demodulator
DQM Digital Quadrature Modulator
DSP Digital Signal Processing
DUC Digital Up Converter
EER Envelope Elimination and Restoration
EF Envelope Following
ET Envelope Tracking
EVM Error Vector Magnitude
FFLPA Feedforward Linear Power Amplifier
FIR Finite Impulse Response
FPGA Field-Programmable Gate Array
GSM Global System for Mobile communications
I-Q In-phase/Quadrature
IF Intermediate Frequency
LINC Linear Amplification using Nonlinear Components
LO Local Oscillator
LPF Low Pass Filter
MCPA Multi-Carrier Power Amplifier
MDS Multi-Directional Search
OFDM Orthogonal Frequency Division Multiplexing
PA Power Amplifier
PAPR Peak-to-Average Power Ratio
PD Digital Baseband Predistortion
PLL Phase Locked Loop
QAM Quadrature Amplitude Modulation
QPSK Quadrature Phase Shift Keying
RF Radio Frequency
RRH Remote Radio Head
RRU Remote Radio Head Unit
SAW Surface Acoustic Wave Filter
UMTS Universal Mobile Telecommunications System
UPC Up Converter
WCDMA Wideband Code Division Multiple Access
WLAN Wireless Local Area Network

What is claimed is:

1. A system comprising:
one or more Digital Access Units (DAUs) operable to receive at least one signal from at least one of a first signal source and a second signal source from one or more of a plurality of signal sources, each DAU of the one of more DAUs including an input port configured as an uplink/downlink port and an output port configured as an uplink/downlink port;
one or more Digital Remote Units (DRUs) connectable to the one or more DAUs and operable to transport signals between one or more of the one or more DRUs and the one or more DAUs;
a plurality of radio resources formed from the one or more DRUs comprising a first radio resource and a second radio resource different from the first radio resource, each radio resource comprising a subset of the plurality of DRUs; and
a traffic monitoring unit coupled to at least one of the DAUs, wherein the traffic monitoring unit is configured to:
determine one or more of: one or more key performance indicators (KPIs) and/or a quality of service (QoS) of a network traffic for the one or more DAUs, wherein the QoS is a function of the one or more KPIs; and
reconfigure the plurality of radio resources based on one or more of the one or more KPIs and/or the QoS by allocating at least one DRU from the first radio resource to the second radio resource.

2. The system of claim 1, further comprising a one or more Base Transceiver Stations (BTSs) coupled to the one or more DAUs, wherein each BTS comprises the plurality of radio resources.

3. The system of claim 2, further comprising a network optimization goal comprising a percentage of users associated with each of the plurality of radio resources.

4. The system of claim 1, wherein the traffic monitoring unit is external to the one or more DAUs.

5. The system of claim 1, wherein the traffic monitoring unit is provided as a component of each of the one or more DAUs.

6. The system of claim 1, wherein the traffic monitoring unit is external to the one or more DRUs.

7. The system of claim 1, wherein the traffic monitoring unit is provided as a component of each of the one or more DRUs.

8. The system of claim 1, wherein the traffic monitoring unit is configured to analyze Key Performance Indicators (KPIs) of the DAS.

9. The system of claim 1, wherein the traffic monitoring unit is configured to analyze Quality of Service (QoS) values of the DAS.

10. A system comprising:
one or more Digital Access Units (DAUs) operable to receive at least one signal from at least one of a first signal source and a second signal source from one or more of a plurality of signal sources, each DAU of the one or more DAUs including an input port configured as an uplink/downlink port and an output port configured as an uplink/downlink port;
one or more Digital Remote Units (DRUs) couplable to the one or more DAUs and operable to transport signals between the one or more DRUs and the one or more DAUs;
a plurality of radio resources formed from the one or more DRUs comprising a first radio resource and a second radio resource different from the first radio resource, each radio resource comprising a subset of the one or more DRUs; and
a traffic monitoring unit external to and couplable to at least one of the DAUs, wherein the traffic monitoring unit is configured to:

determine one or more of one or more key performance indicators (KPIs) and/or a quality of service (QoS) of a network traffic for the one or more DAUs, wherein the QoS is a function of the one or more KPIs; and reconfigure the plurality of radio resources based on one or more of the one or more KPIs and/or the QoS by allocating at least one DRU from the first radio resource to the second radio resource.

11. The system of claim 10, wherein the traffic monitoring unit is external to one or more Base Transceiver Stations (BTSs) and coupled to each of the one or more BTSs.

12. The system of claim 10, further comprising a network optimization processor coupled to the traffic monitoring unit.

13. The system of claim 10, wherein the one or more DAUs are coupled via at least one of an ethernet cable, optical fiber, microwave line of sight link, wireless link, and/or satellite link.

14. The system of claim 10, wherein the one or more DAUs are coupled to the one or more DRUs via at least one of an ethernet cable, optical fiber, microwave line of sight link, wireless link, and/or satellite link.

15. The system of claim 10, wherein the one or more DRUs are connected in a daisy chain configuration.

16. The system of claim 10, wherein the one or more DRUs are connected to the one or more DAUs in a star configuration.

17. The system of claim 10, wherein the one or more DAUs are connected to one or more BTSs via at least one of an ethernet cable, optical fiber, microwave line of sight link, wireless link, and/or satellite link.

18. The system of claim 10, wherein the one or more DRUs are connected in a loop to one or more of the one or more DAUs.

19. The system of claim 10, wherein a single DAU port is connected to one or more BTSs.

* * * * *